United States Patent

Huizer et al.

[11] Patent Number: 5,875,303
[45] Date of Patent: Feb. 23, 1999

[54] METHOD AND ARRANGEMENT FOR TRANSMITTING AN INTERACTIVE AUDIOVISUAL PROGRAM

[75] Inventors: Cornelis M. Huizer; Peter B. Kaars; Balthasar A.G. Van Luijt; Frank Bosveld, all of Eindhoven, Netherlands

[73] Assignee: U.S. Philips Corporation, New York, N.Y.

[21] Appl. No.: 540,514

[22] Filed: Oct. 10, 1995

[30] Foreign Application Priority Data

Oct. 11, 1994 [EP] European Pat. Off. ............ 94202994.8

[51] Int. Cl.$^6$ ................................................... H04N 01/32
[52] U.S. Cl. ...................................... 395/200.61; 370/355
[58] Field of Search ........................... 364/514 R, 715.02; 348/394, 415, 13; 370/355; 395/114, 481, 497.04, 200.49, 200.61

[56] References Cited

U.S. PATENT DOCUMENTS

| | | | |
|---|---|---|---|
| 5,289,276 | 2/1994 | Siracusa et al. | 348/467 |
| 5,463,565 | 10/1995 | Cookson et al. | 364/514 R |
| 5,488,410 | 1/1996 | Lieberfarb et al. | 348/5.5 |
| 5,548,532 | 8/1996 | Menand et al. | 364/514 C |
| 5,619,501 | 4/1997 | Tamer et al. | 370/392 |

FOREIGN PATENT DOCUMENTS 0579075  1/1994  European Pat. Off. .

OTHER PUBLICATIONS

CDi Full Functional Specification, Philips Consumer Electronics, B.V. Mar. 1993 (Green Book).
"CD–DA System Description" Sony Corporation, And N.V. Philips, Nov. 1991 (Red Book).

Primary Examiner—James P. Trammell
Assistant Examiner—Thomas Peeso
Attorney, Agent, or Firm—Laurie E. Gathman

[57] ABSTRACT

Disclosed are a method and arrangement for accessing interactive audiovisual programs stored on a remote server (1) by a multimedia station (2). The audiovisual program is stored in the same format as it is stored on a CDi disc, i.e. in the form of sectors. Although based on the same data compression technology, the CDi video coding standard does not comply with the MPEG coding specification. Moreover, MPEG does not cover the handling of specific CDi features. In order to allow conventional CDi decoders to access remotely stored CDi applications via interactive networks (3,4), the interactive audiovisual program is transmitted as a private MPEG2 data stream, using the concept of MPEG's transport stream. The multimedia station comprises a network interface (7) having a circuit (72) which assembles the transport packets and applies the signal sectorwise to a "stripped" CDi player (5,6).

16 Claims, 3 Drawing Sheets

METHOD AND ARRANGEMENT FOR TRANSMITTING AN INTERACTIVE AUDIOVISUAL PROGRAM

FIELD OF THE INVENTION

The invention relates to a method of transmitting an interactive audiovisual program from a remote server to a multimedia station. The invention also relates to a method of receiving the audiovisual program, and to the server and multimedia station.

BACKGROUND OF THE INVENTION

A known device for accessing interactive audiovisual programs is the Compact Disc Interactive (CDi) player. A large amount of multimedia applications have been developed for this device. A CDi disc comprises an audiovisual program and application software. The application software allows a user to access the program material in an interactive manner. For example, after displaying a particular program item, the player stops and the user is given the opportunity to indicate whether he wants the program item to be repeated or to proceed to a different program item. User commands are given by moving a cursor in a graphic menu. Upon activating the cursor, the application software determines from which location on disc the recorded program is to be continued.

The audiovisual program, application software and graphic images are collectively referred to as "real-time" file. The real-time file is stored on a plurality of sectors of the CDi disc. The CDi system ensures that related assets within a real-time file are kept together and that all assets needed for a given application are delivered in real-time with proper synchronization of video, audio, and graphics overlays augmenting the audiovisual program.

A CDi player is a stand-alone system. The real-time file is stored on tracks of the CDi disc. The storage format is specified in "CDi Full Functional Specification", Philips Consumer Electronics B.V., March 1993, usually referred to as the Green Book. As far as relevant to the invention, the storage format will now be summarized. The CDi disc has a lead-in track, up to 99 information tracks, and a lead-out track. Information tracks can carry either CDi data or digital audio (DA). They are referred to as CDi tracks and DA tracks, respectively. With each track, eight subcode channels are associated, usually denoted PQRSTUVW subcode channels. The subcode channels contain control and display information. CDi tracks are divided into sectors of 2352 bytes. With each sector, 98 bytes of subcode data are associated. DA tracks are divided into audio blocks of 2352 bytes. With each audio block, 98 bytes of subcode data are associated. The format of DA tracks complies with the well-known compact disc digital audio specification as defined in "CD-DA System description", Sony Corp. and N.V. Philips, November 1991, also referred to as the Red Book. Further, the Q subcode channel associated with the lead-in track contains the table of contents (TOC) of the disc.

OBJECT AND SUMMARY OF THE INVENTION

It is an object of the invention to provide methods and arrangements for accessing remotely stored interactive audiovisual program material.

In order to achieve this object, the invention provides a method of transmitting, via a transmission medium, an audiovisual program stored on respective sectors of a recording medium, comprising the step of accommodating each sector in a predetermined number of transport packets. Preferably, the transport packets are transport packets of an MPEG private transport stream. The term MPEG is here understood to mean the generic standard for coding of moving pictures and associated audio information as specified in ISO/IEC 13818-1, in as far as said standard refers to transport streams for the transmission of audiovisual programs via carriers such as terrestrial or satellite broadcast channels, cable networks, telecommunication networks, optical and magnetic storage media etc. The handling of multimedia assets, such as sound maps, in combination with audio and video material has not received the level of attention within MPEG which is necessary for the transmission of CDi applications. Interactive audiovisual material which has been developed for CDi players and which are stored on CDi discs, can thus not run on a remote transmitter, e.g. a server. The invention provides a solution to this problem by encapsulating the disc based CDi application in a bit stream that complies with the MPEG standard. The corresponding method of receiving and reproducing the signal comprises the step of accommodating a predetermined number of successive packets in sectors and applying said sectors to a decoder arranged to decode and reproduce said sectors.

The obtained signal can thus directly be applied to the decoder circuitry of a conventional CDi player.

DESCRIPTION OF EMBODIMENTS

Figure 1:
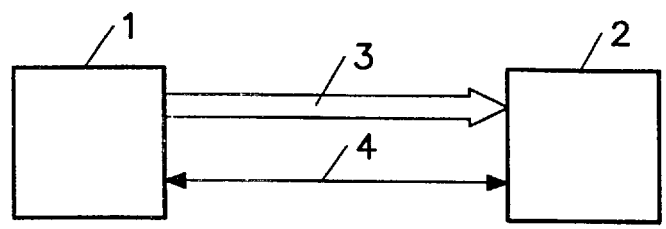
FIG. 1 shows a transmission system for carrying out the method according to the invention.

FIG. 1 shows a transmission system for carrying out the method according to the invention. The system comprises a server 1, an interactive multimedia station 2, a unidirectional high-speed transmission network 3 for the transmission of digitally encoded audiovisual program material, and a bidirectional control channel 4. The unidirectional high-speed network 3 may take the form, inter alia, of a channel in an ATM environment or an RF channel in a cable, terrestrial or satellite network. The bidirectional control channel 4 may use the same or a different network technology.

A significant advantage of the invention is that the interactive multimedia station 2 may take the form of a stripped CDi player, i.e. a CDi player having an appropriate network interface instead of a disc deck (i.e. disc rotating unit and driver electronic circuitry). Via the network interface, the station communicates with the server at the same abstraction level as the level at which the control circuitry of a CDi player communicates with its disc deck. The following commands are relevant to the invention: "mount disk number #", "start playback at sector mm:ss:ff" and "stop". The server x responds to these commands by selecting a disc, playing said disc from the specified sector, and stopping, respectively. Note that the expression "selecting a disc" is not necessarily to be interpreted literally, because the server may have stored a CDi application in other types of memory, such as a hard disk or a semiconductor memory.

According to the invention, the CDi real-time file is mapped into an MPEG transport stream. Transport streams pursuant to ISO/IEC 13818-1 consist of transport packets having a length of 188 bytes. Each packets starts with a 4-bytes packet header which may optionally be followed by an adaptation field. The rest of the packet is referred to as the payload. One of the parameters in the packet header is the packet identifier (PID), a 13-bit field indicating the data stream to which the packet belongs. Using the standard mechanism of MPEG2, the Program Specific Information indicates that the transport stream is a private stream.

More in particular, each sector of a CDi track, and optionally the associated parts of the P and Q subcode channels, is mapped into 13 successive transport packets. Such a sequence of 13 packets will further be referred to as a sector packet train. In a similar manner, each audio block of a DA-track, and optionally the associated parts of the P and Q subcode channels, is mapped into 13 successive transport packets. This sequence of 13 packets will further be referred to as an audio packet train. The TOC of the CDi disc, as carried in the Q subcode channel of the lead-in track, is also mapped into 13 transport packets. This sequence of 13 packets will further be referred to as the TOC packet train. The transmission order of the packet trains corresponds with the order of sectors and audio blocks on the CDi disc. The TOC packet train is transmitted first. Moreover, the TOC packet train is transmitted upon request of the station.

Figure 2:
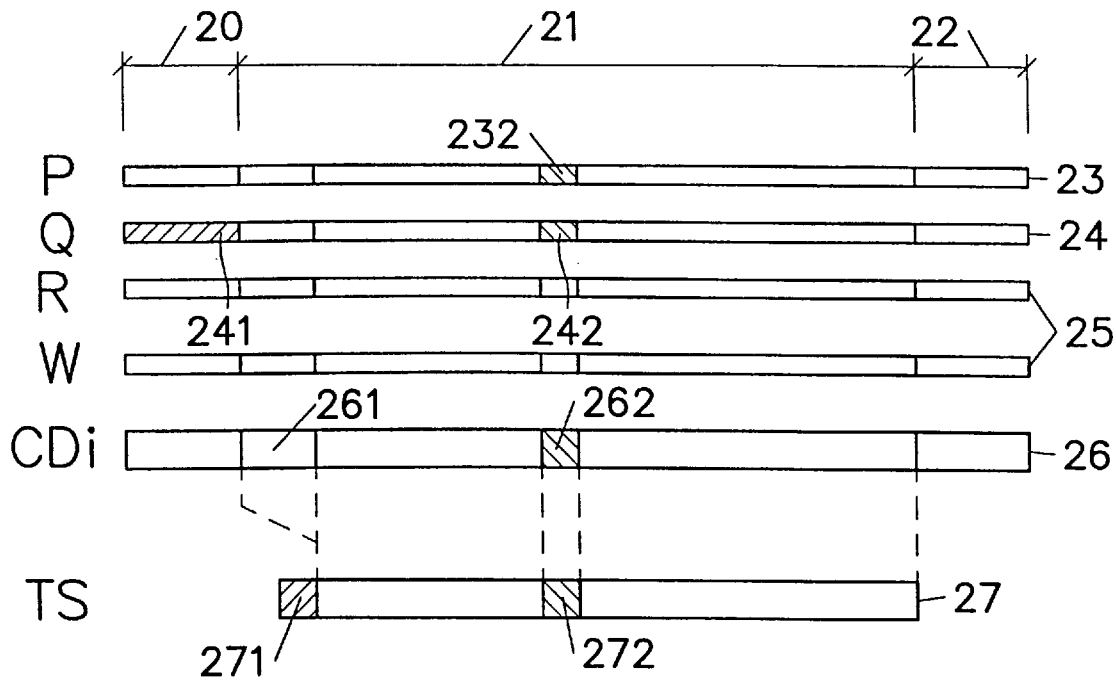
FIGS. 2 and 3 show an example of mapping the contents of a CDi disc into an MPEG transport stream.

FIG. 2 shows an example of the mapping of the contents of a CDi disc into an MPEG2 transport stream. The lead-in area of the disc is denoted 20, the program area is denoted 21, and the lead-out area is denoted 22. Reference numeral 23 indicates the P subcode channel, 24 the Q subcode channel, 25 the RSTUVW subcode channels, and 26 the sequence of CDi (or DA) tracks. Numeral 27 denotes the MPEG2 transport stream (TS). As is tried to illustrate in the Figure, the Q subcode channel 241 associated with the lead-in track (i.e. the TOC) is mapped into thirteen TS packets, collectively denoted 271. Individual CDi sectors 262 (or DA blocks as the case may be) with their associated P subcode channel 232 and Q subcode channel 242 are mapped into thirteen TS packets, collectively denoted 272. The sectors between 00:00:00 and 00:02:00 (denoted 261) are not conveyed by the transport stream.

Figure 3:
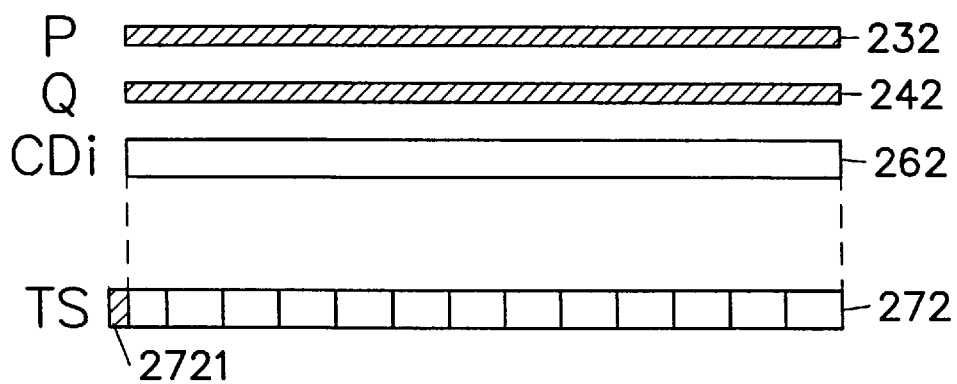

FIG. 3 shows the mapping of a CDi sector 262 having the sector number mm:ss:ff (or a DA block) into a train 272 of thirteen TS packets in more details. Each packet has a length of 188 bytes, four bytes of which constitute the packet header. The first packet of the sector packet train (or audio sector train) has an adaptation field 2721 of 40 bytes, leaving a payload of 144 bytes. The other twelve packets have a payload of 184 bytes. The thirteen packets thus convey 144+12*184=2352 bytes, i.e. the data in a CDi sector or DA block. The private data part of the adaptation field of the first packet conveys the P subcode channel 232 and the Q subcode channel 242 associated with the sector. The bitrate of the MPEG2 transport stream carrying a CDi application is 75 (sectors/sec)*13 (packets/sector)*188 (bytes/packet)*8 (bits/byte)=1,466,400 bits/sec.

A more detailed definition of the transport packet header is now given with reference to section 2.4.3 of ISO/IEC 13818-1. All TS packets have the same value of the PID field. The transport_error_indicator field of all packets is set to '0'. The payload_start_indicator field of all packets is set to '0'. The transport_priority field of all packets is set to '0'. The adaptation_field_control field of the first packet of a sector packet train or train audio packet train (272 in FIG. 2) is '11', the other packets have this field set to '01'. The packets of the TOC packet train (271 in FIG. 2) have only an adaptation field and no payload. Accordingly, the adaptation_field_control fields of these packets are all '10'. The continuity_counter is continuous for all packets of the transport stream.

In the packets having an adaptation field, the subcode channel information is conveyed as a series of private_data_bytes. This is indicated by the value '1' of the field transport_private_data_flag in the adaptation field. The number of bytes is encoded in the field transport_private_data_length. The adaptation field of the first packet of sector packet trains and audio packet trains comprises 31 bytes of P and Q subcode channel data. The adaptation field of each packet of the TOC packet train comprises 181 bytes of TOC data.

Further, the adaptation field contains a Program Clock Reference (PCR) to regenerate a system clock in the station for controlling the reproduction of the audiovisual material. The PCR values for the transport stream conveying the CDi program are based on CDi's sector rate of 75 sectors/sec. Hence, 75 sector packet trains have to enter the System Target Decoder per second. Since each sector packet train carries exactly one PCR at a fixed position, the time interval between two consecutive PCR fields is fixed and equals 1/75 second. Accordingly, the PCR_base field value increments by 1200 each sector packet train, whereas the PCR_ext field has the value 0.

As described above, the multimedia station 2 (FIG. 1) issues commands to the server such as "start playback at sector mm:ss:ff" and "stop". In a stand-alone system such as the CDi player, these commands are processed without any time delay. The system shown in FIG. 1, however, suffers from considerable time delays. The following example will illustrate the problems associated therewith. In this example, the station 2 is assumed to reproduce the audiovisual signal recorded in sectors 02:02:16, 02:02:17, 02:02:18, 02:02:19, 02:02:23, 02:02:24, etc. This is achieved by the following process steps:

issue the command "start at sector 02:02:16"

detect the reception of sector 02:02:19 issue the command "stop", and, virtually at the same time, issue the command "start at sector 02:02:23"

Figure 4:
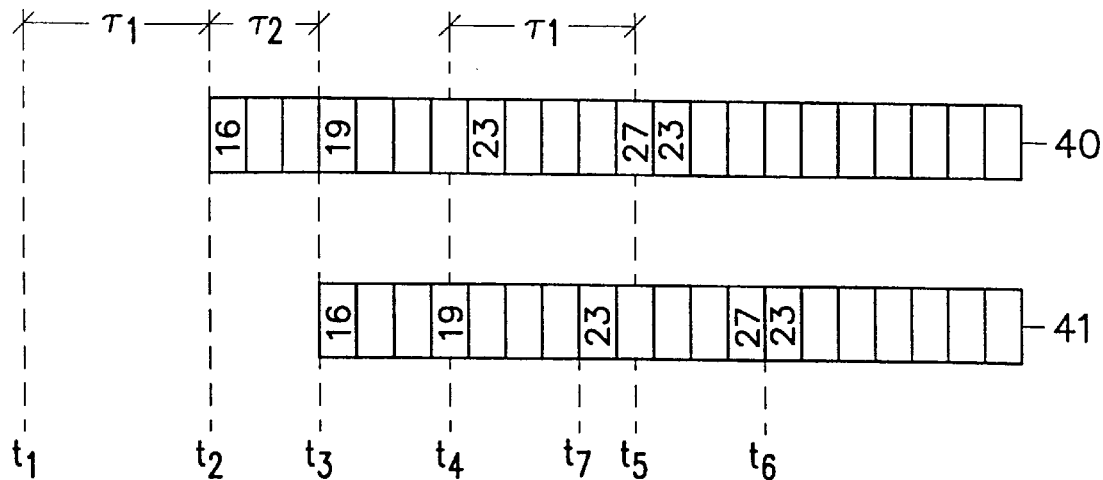
FIGS. 4 and 5 show timing diagrams to illustrate the operation of the system shown in FIG. 1.

FIG. 4 shows a timing diagram illustrating the problem caused by time delays in the system. In the Figure, $t_1$ denotes the instant of time at which the command "start at sector 02:02:16" is issued by the multimedia station. This command is received by the server with a delay $\tau_1$, i.e. at $t=t_2$. In response to the command, the server transmits a transport stream 40 starting with sector 02:02:16 ("16" for short in the Figure). The transport stream is received by the station with a further time delay $\tau_2$ as indicated with 41 in the Figure. Thus, the first sector 02:02:16 is received at $t=t_3$. At $t=t_4$, the station detects the reception of sector 02:02:19. In response thereto, the station issues the commands "stop" and, virtually simultaneously therewith, the command "start at sector 02:02:23". The server receives these two commands at $t=t_5$. The server has meanwhile progressed with the transmission of sectors up to sector 02:02:27. In response to the stop/start command, the server completes the transmission of sector 02:02:27 and transmits sector 02:02:23 as requested. The station does not receive this sector 02:02:23 until $t=t_6$.

After having issued the stop command at $t=t_4$, the multimedia station scans the received transport stream for the occurrence of sector 02:02:23 to be processed next. As FIG. 4 shows, this sector is received twice, once at $t=t_7$ as a result of the delayed processing of the stop command by the server, and once at $t=t_6$ as explicitly requested by the station. The station considers the first reception, at $t=t_7$, as the requested one and reproduces the contents of this sector and the next ones. Needless to say that this leads to an incorrect reproduction of the CDi program.

According to an embodiment of the invention, this problem is solved by dynamically inserting an MPEG2 compliant control packet in the transport stream between the end of a requested series of packets and the beginning of a new series. The transmission of such a control packet can be initiated by the command "stop" or the command "start at sector mm:ss:ff". Accordingly, the multimedia station is adapted, after each "start" command, to look for said control packet and the requested sector received thereafter.

Figure 5:
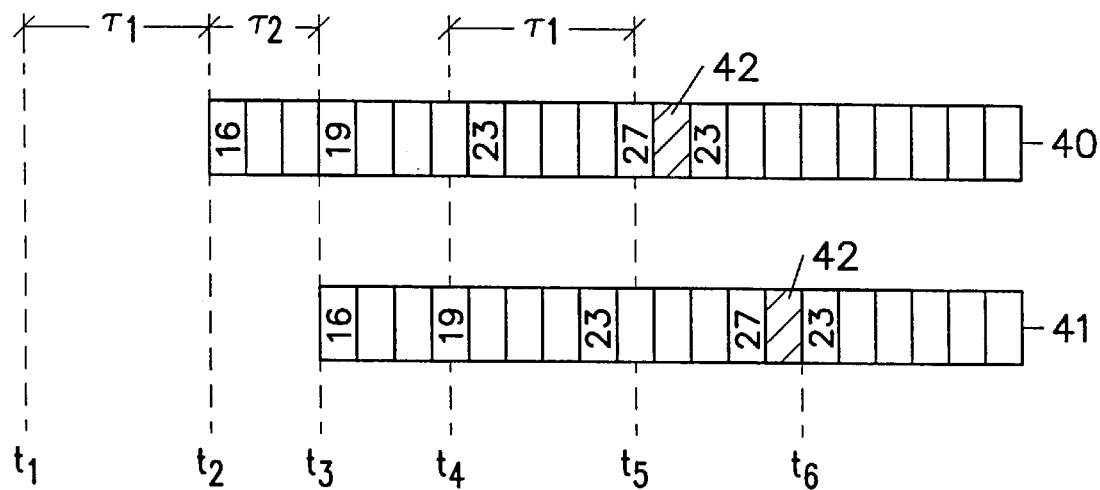

FIG. 5 shows a timing diagram illustrating the method according to this embodiment. At $t=t_5$, the server receives the stop command which was issued by the station at $t=t_4$. In response thereto, the server completes the transmission of the current sector (02:02:27) and then transmits a control packet 42 before resuming the transmission with requested sector 02:02:23. In practical embodiments, the requested sector may be preceded by a few preceding packets. Further, gaps in the transport stream may be filled with the transmission of null packets.

After having reproduced the sectors 02:02:16 to 02:02:19, the decoder now refrains from processing further sectors until this control packet 42 has been received. As will be appreciated, the correct sector 02:02:23 received at $t=t_6$ will now be processed. All control packets have the same value of the PID field. Preferably, the value is different from the PID of the CDi packets. This allows a simple MPEG2 demultiplexer to detect the control packets.

Figure 6:
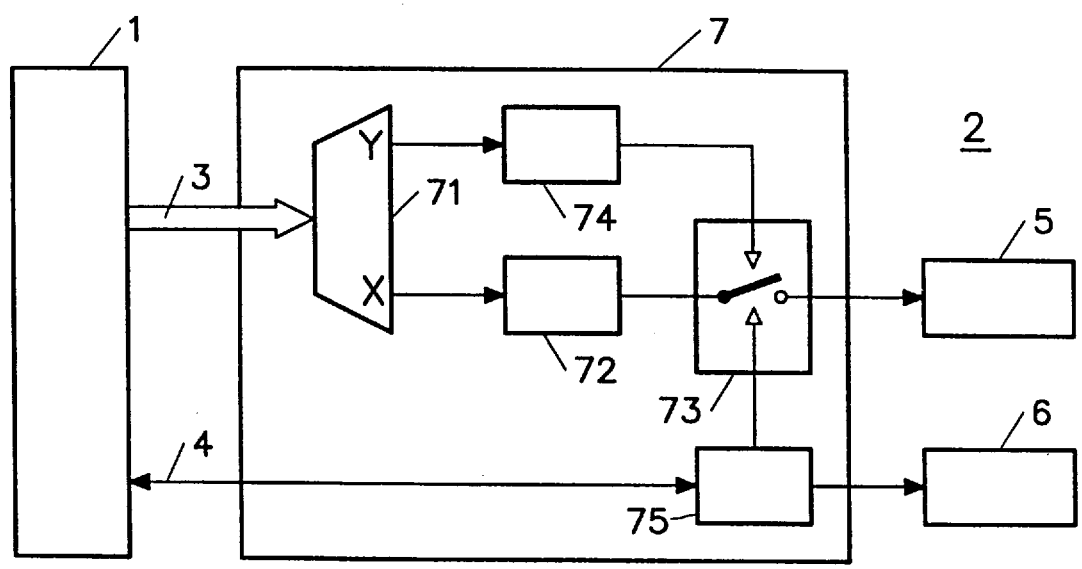
FIG. 6 shows the system of FIG. 1 in more details.

FIG. 6 shows the system of FIG. 1 in more details. In the Figure, numerals 5 and 6 denote a CDi decoder and control circuit, respectively, of a conventional CDi player. Numeral 7 is a network interface which interfaces the "stripped" CDi player with the high-speed transmission channel 3 and the control channel 4. CDi decoder 5 and control circuit 6 interface with network interface 7 as with the disc deck of a conventional CDi player. The network interface comprises an MPEG2 demultiplexer 71, a sector assembly circuit 72, a switch 73, a control packet decoder 74, and a control interface circuit 75.

In operation, the MPEG2 demultiplexer 71 receives an MPEG2 transport stream via the high-speed transmission channel x. The demultiplexer applies the TS packets with the PID field having a predetermined value X to sector assembly circuit 72, and TS packets with the PID field having a predetermined value Y to control packet decoder 74. The sector assembly circuit is adapted to collect the payload of the thirteen successive TS packets corresponding to a sector, and to apply the payload sectorwise to CDi decoder 5 via the switch 73. The CDi decoder reproduces the signal in a similar manner as in a CDi player. When the last of a requested series of sectors is being processed, control circuit 6 issues a "stop" command to the server. The control interface circuit 75 detects this command and applies a signal to the switch 73 so as to prevent further sectors from being applied to the CDi decoder. New sectors are thus not applied to the CDi decoder until the switch 73 is closed in response to the detection of a control packet by the control packet decoder 74.

In summary, the invention relates to a method and arrangement for accessing interactive audiovisual programs stored on a remote server (1) by a multimedia station (2). The audiovisual program is stored in the same format as it is stored on a CDi disc, i.e. in the form of sectors. Although based on the same data compression technology, the CDi video coding standard does not comply with the MPEG coding specification. Moreover, MPEG does not cover the handling of specific CDi features. In order to allow conventional CDi decoders to access remotely stored CDi applications via interactive networks (3,4), the interactive audiovisual program is transmitted as a private MPEG2 data stream, using the concept of MPEG's transport stream. The multimedia station comprises a network interface (7) having a circuit (72) which assembles the transport packets and applies the signal sectorwise to a "stripped" CDi player (5,6).

We claim:

1. A method for delivering CDi multimedia data from a first location to a second location remote from the first location, comprising the steps of:
    mapping the CDi multimedia data into an MPEG transport stream to produce a CDi transmission stream; and,
    transmitting the CDi transmission stream from the first location to the second location via a transmission channel, wherein the CDi multimedia data includes a plurality of sectors of CDi multimedia data and the MPEG transport stream includes a multiplicity of transport packets, and the mapping step comprises the sub-step of mapping each sector of CDi multimedia data into a prescribed number of transport packets.

2. The method as set forth in claim 1, wherein the first location comprises a data distribution node in a data communications network, and the second location comprises a CDi decoder interfaced to the data communications network.

3. The method as set forth in claim 2, wherein the data distribution node comprises a data server.

4. The method as set forth in claim 1, wherein the mapping step comprises the further sub-step of inserting control packets between successive series of transport packets.

5. The method as set forth in claim 1, wherein the control packets comprise MPEG transport packets having a PID which is different from the PID of the transport packets which carry the sectors of CDi multimedia data.

6. The method as set forth in claim 1, wherein the transport packets comprise transport packets of a private data stream within the MPEG transport stream.

7. A network CDi playback device, comprising:
    a CDi decoder, and,
    a network interface which interfaces the CDi decoder with network transmission channel which links the network CDi playback device with a remotely-located CDi multimedia data sever, wherein the network interface comprises:
        a sector assembly circuit which receives transport stream data packets and collects a prescribed number of successive transport stream data packets corresponding to a sector of CDi multimedia program data; and,
        a control circuit for selectively applying each sector of CDi multimedia program data to the CDi decoder for decoding and reproduction.

8. The network CDi playback device as set forth in claim 7, wherein the network interface comprises:
    an MPEG demultiplexer which receives an MPEG transport stream via the network transmission channel and demultiplexes the MPEG transport stream in such a manner as to transmit transport stream data packets via a first path and transport stream control packets via a second path;
    a sector assembly circuit which receives the transport stream data packets and collects a prescribed number of successive transport stream data packets corresponding to a sector of CDi multimedia program data;

a switch which selectively couples the sector assembly circuit and the CDi decoder;

a control packet decoder which receives the transport stream control packets;

a control circuit for issuing a stop command to the server when a last one of a requested series of transport stream data packet is being processed; and, a control interface circuit which opens the switch in response to detection of the stop command in order to uncouple the sector assembly circuit and the CDi decoder, and which closes the switch in response to detection of a transport stream control packet by the control packet decoder in order to recouple the sector assembly circuit and the CDi decoder.

9. The network CDi playback device as set forth in claim 8, wherein the network Cdi playback device does not require a disk deck in order to reproduce CDi multimedia data.

10. A signal which is comprised of an MPEG transport stream which includes a multiplicity of transport data packets, wherein the transport data packets comprise CDi multmedia program material.

11. The signal as set forth in claim 10, wherein the transport data packets comprise private data stream transport packets.

12. The signal as set forth in claim 10, wherein:

the CDi multmedia program material includes a plurality of sectors of multimedia data; and, each sector of CDi multmedia program material is mapped into a prescribed number of transport data packets.

13. The signal as set forth in claim 12, wherein the signal further includes control packets inserted between successive series of transport data packets to facilitate decoding of the CDi multmedia program material.

14. The signal as set forth in claim 13, wherein the transport data packets each have a first PID and the control packets each have a second PID.

15. A multimedia station, comprising:

a CDi decoder; and, network interface which interfaces the CDi decoder with a network transmission channel which links the multimedia station with remotely-located CDi multimedia data server, wherein the network interface comprises:

a sector assembly circuit which receives transport stream data packets and collects a prescribed number of successive transport stream data packets corresponding to a sector of CDi multimedia program data; and, a control circuit for selectively applying each sector of CDi multimedia program data to the CDi decoder for decoding and reproduction.

16. The multimedia station as set forth in claim 15, wherein the network interface comprises:

an MPEG demultiplexer which receives an MPEG transport stream via the network transmission channel and demultiplexes the MPEG transport stream in such a manner as to transmit transport stream data packets via a first path and transport stream control packets via a second path;

a sector assembly circuit which receives the transport stream data packets and collects a prescribed number of successive transport stream data packets corresponding to a sector of CDi multimedia program data;

a switch which selectively couples the sector assembly circuit and the CDi decoder;

a control packet decoder which receives the transport stream control packets;

a control circuit for issuing a stop command to the server when a last one of a requested series of transport stream data packet is being processed; and, a control interface circuit which opens the switch in response to detection of the stop command in order to uncouple the sector assembly circuit and the CDi decoder, and which closes the switch in response to detection of a transport stream control packet by the control packet decoder in order to recouple the sector assembly circuit and the CDi decoder.

* * * * *